May 21, 1957      H. VERMETTE      2,793,043
DOUBLE SCROLL CHUCK CONSTRUCTION
Filed Jan. 24, 1955      4 Sheets-Sheet 1
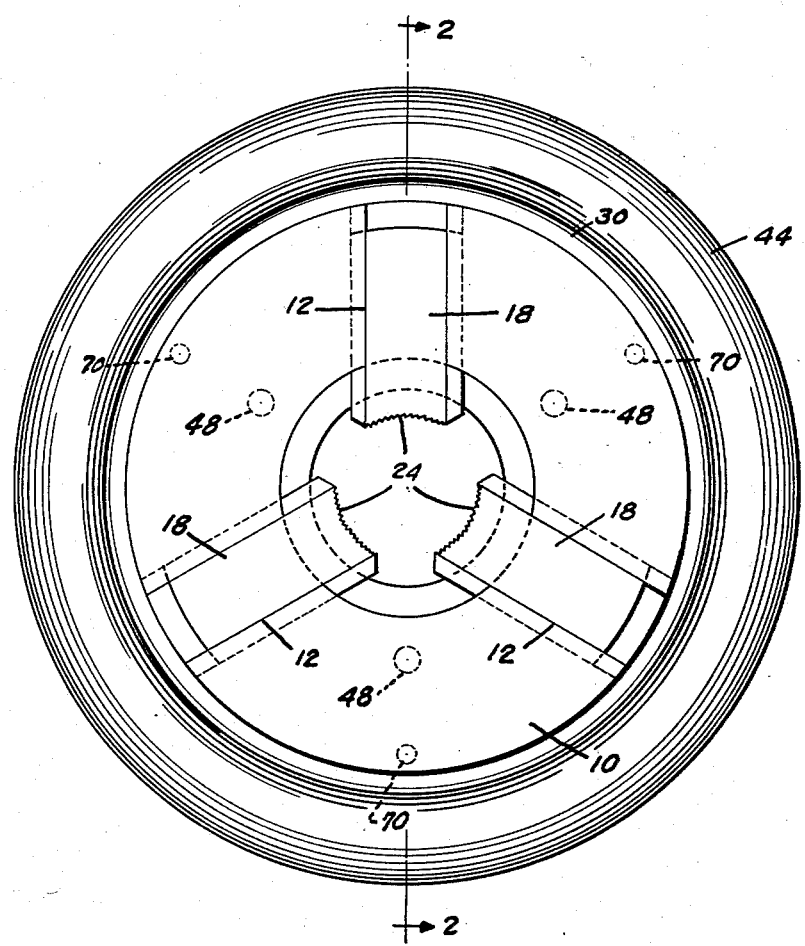
Fig. 1.
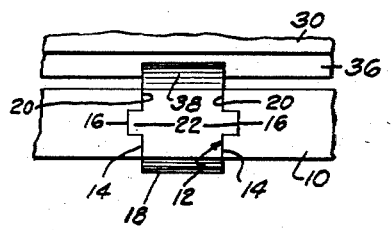
Fig. 1-A
INVENTOR.
HOWARD VERMETTE
BY
John B. Hosty
ATTORNEY.

May 21, 1957 H. VERMETTE 2,793,043
DOUBLE SCROLL CHUCK CONSTRUCTION
Filed Jan. 24, 1955 4 Sheets-Sheet 2
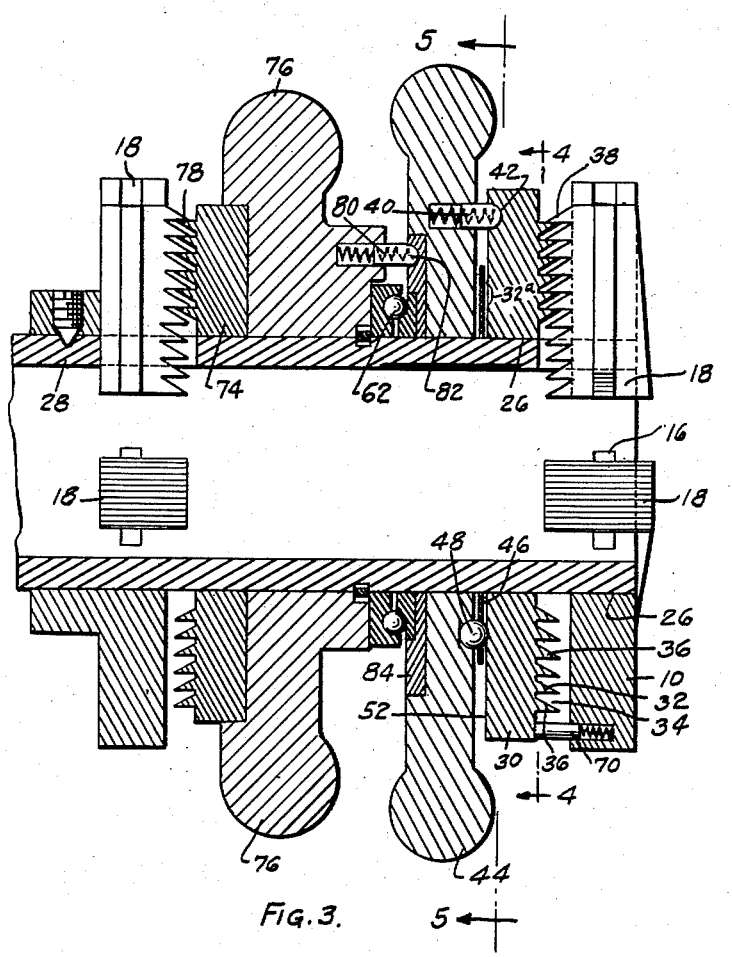
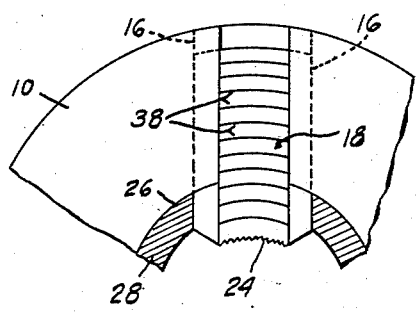
INVENTOR.
HOWARD VERMETTE
BY
John B. Hosty
ATTORNEY.

May 21, 1957  H. VERMETTE  2,793,043
DOUBLE SCROLL CHUCK CONSTRUCTION
Filed Jan. 24, 1955  4 Sheets-Sheet 3

INVENTOR.
HOWARD VERMETTE
BY John B Hosty
ATTORNEY.

May 21, 1957
H. VERMETTE
2,793,043
DOUBLE SCROLL CHUCK CONSTRUCTION
Filed Jan. 24, 1955
4 Sheets-Sheet 4
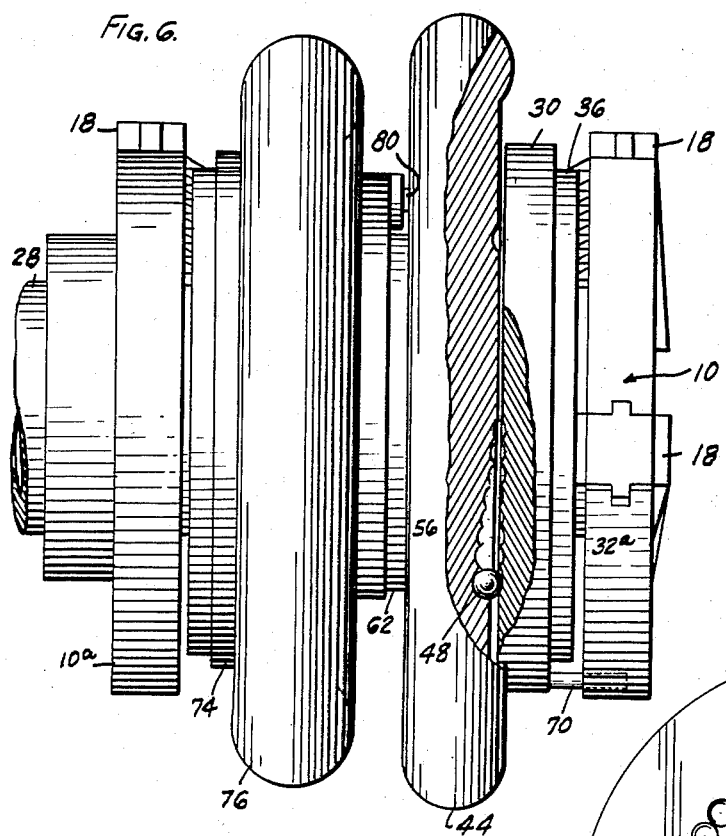
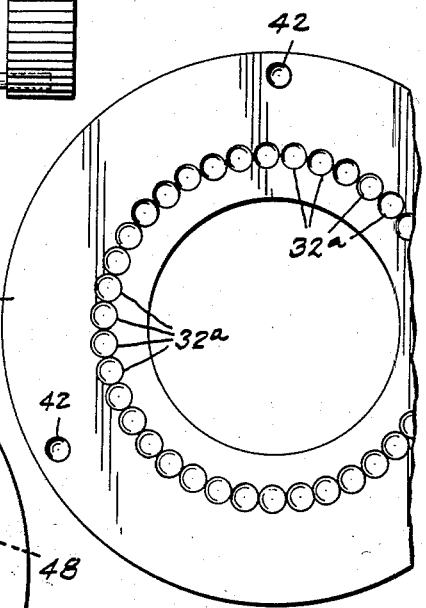
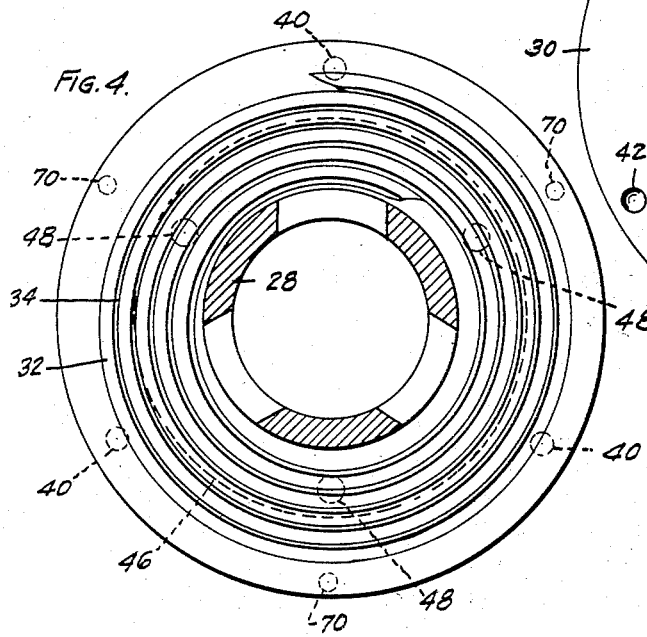
INVENTOR.
HOWARD VERMETTE
BY John B. Hosty
ATTORNEY.

United States Patent Office 2,793,043
Patented May 21, 1957

2,793,043

DOUBLE SCROLL CHUCK CONSTRUCTION

Howard Vermette, Hammond, Ind.

Application January 24, 1955, Serial No. 483,469

10 Claims. (Cl. 279—114)

My invention relates to improvements in chuck construction.

My invention relates more particularly to work gripping chucks of the types used on lathes or other similar types of machinery, and more particularly to a manually operable adjusting and locking device for the work gripping jaws.

The principal object of the invention is to provide a work holding chuck of the type described which has improved jaw actuating means and an improved locking scroll disc associated with and actuated by a hand wheel that has considerable weight in its periphery, which weight will be utilized in connection with the scroll disc and locking jaws so that the jaws will be effectively locked to and hold a work piece by cooperation of the scroll and hand wheel.

A further object of the invention is to provide an improved disc scroll and work gripping jaw combination wherein the construction of the toothed face of the scroll and the complementary ridges of the jaw are so constructed that considerably more pressure will be brought to bear in moving the jaws to a work piece holding position than in the scrolls of the prior art.

A further object of the invention is to provide a scroll and jaw construction by means of which a direct wedging action is obtained between the cooperating grooves and teeth of the scroll and work holding jaw.

A further object of the invention is to provide an improved hand operated chuck which has a hand wheel capable of effecting cam leverage to tighten and maintain the hold of the scroll and jaws upon the work piece mounted therein, and which when reversed maintains a tight hold upon the work piece.

A further object of the invention is to provide a chuck of this kind with an improved construction of hand wheel scroll and work holding jaw combination which is easily operated to provide extremely high pressure to tighten the jaws upon the work piece, yet which, when it is desired, can be easily and simply released.

A further object is to provide in combination with the work holding jaws of a chuck an auxiliary set of jaws spaced therefrom to maintain and steady the work piece that is held in the chuck, both of said sets of jaws and scrolls operable by a single hand wheel, yet both sets of jaws independently operable when desired by separate hand wheels.

Other objects and advantages will be more apparent from the following description wherein reference is had to the accompanying drawings, upon which, Fig. 1 is a front elevational view of one type of chuck embodying my invention;

Fig. 1-A is a fragmentary plan view showing a portion of the scroll disc chuck body and one of the jaws;

Fig. 2 is a cross-sectional view thereof taken generally on the line 2—2 of Fig. 1;

Fig. 3 is a fragmentary back view of one of the jaws and a portion of the chuck body in which the same is mounted;

Fig. 4 is a vertical sectional view on the line 4—4 of Fig. 2, showing the front of my improved scroll;

Fig. 6 is a fragmentary side elevational view of the chuck with a portion of the hand wheel broken into section to show the stepped cam paths thereon together with the ball members that cooperate therewith; and Fig. 7 is a fragmentary back view of the front scroll.

Figure 5:
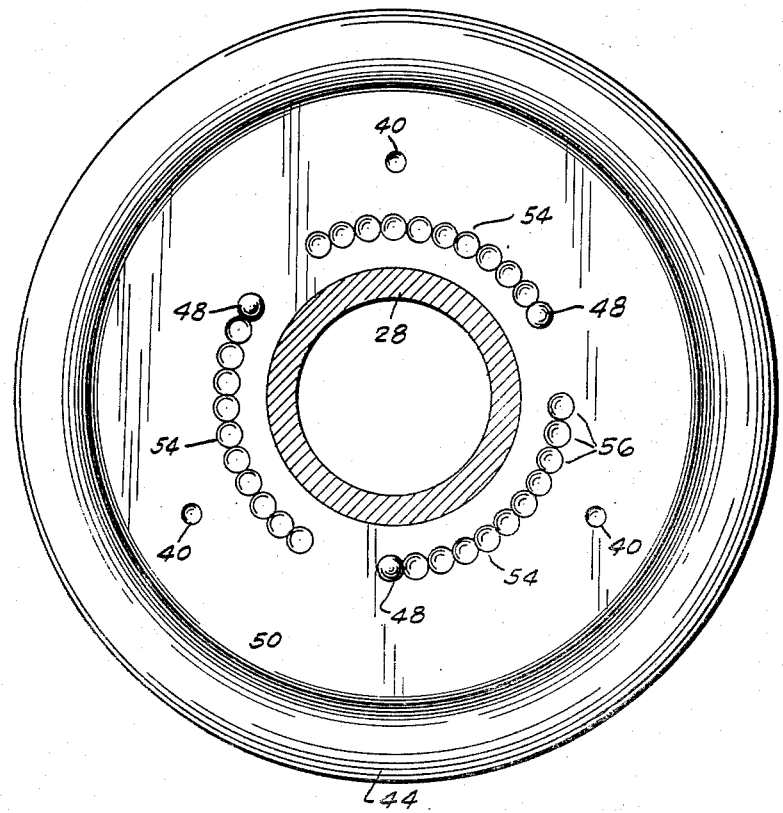
Fig. 5 is a cross-sectional view on the line 5—5 of Fig. 2, showing the cam paths on the hand wheel together with the ball members that cooperate therewith.

In the embodiment of the invention which I have chosen to illustrate and describe the same, the essential elements thereof may include a chuck body 10 that has a plurality of radially disposed slots 12, each of which has the parallel side walls 14 and medially disposed grooves 16. Inwardly and outwardly movable jaw members 18 are mounted one in each of the slots 12, the jaw members having parallel side walls 20 complementary to the walls 14 of the slot 12, and tongue members 22 complementary to and disposed within the grooves 16. The work holding jaws 18 each have arcuately shaped serrated work gripping surfaces 24 on their inner faces. The chuck body has an axial bore 26 to receive a hollow drive shaft 28 connected as desired to the operating machine upon which the chuck is mounted.

A scroll disc 30 may be rotatably mounted upon the hollow shaft 28, the scroll disc having upon its forward face a spiral scroll 32 constructed with generally V-shaped grooves 34 and tapering or wedge-shaped ridges 36. The back of each of the jaw members 18 is provided with arcuately disposed and backwardly projecting tapered teeth 38 generally triangular in shape and complementary to the grooves 34 of the scroll. A hand wheel 44 may be mounted for rotation on the shaft 28, the hand wheel being provided with a plurality of spring-pressed pins 40 which normally rest in spherically shaped depressions 42 in the back face of the scroll disc 30. A ball retainer plate 46 which carries a plurality of balls 48 may be disposed between the forward face 50 of the hand wheel 44 and the back face 52 of the scroll disc 32.

As best shown in Fig. 5, the ball members 48 are disposed against arcuate cam paths 54 on the forward face 50 of the hand wheel. Each one of the cam paths 54 is provided with a series of steps or pockets 56 which, when the hand wheel is rotated independent of rotation of the scroll disc, will climb up the cam path step by step from the lowermost step or pocket 56, thereby moving the cam disc forward into a lock gripping relation with the work holding jaws 18.

The back face 52 of the scroll disc 32, see Fig. 7, has a circular series of shallow pockets or depressions 32a which receive the balls, thereby locking the scroll disc and the hand wheel together. The opposed face 50 of the hand wheel 44 rides against a thrust bearing 62 rigidly mounted on the shaft 28.

With this construction it can be seen that when it is desired to hold a work piece in the jaws 18, the work is placed inside of the hollow shaft 10 and the hand wheel 44 is turned. By means of the pins 40 the disc scroll will be rotated, thus moving the jaw members toward the axis of the same. When the jaws have been fastened on the work piece, pins 40 will snap out of the spherical depressions 42 and the balls 48 will start to to climb their cam paths step by step to wedge the scroll on to the jaws. The cam track is provided with spherical depressions at spaced elevations so that in a final wedging and locking condition there will be no tendency to roll back down the cam path, since each ball is now resting in a pair of facing pockets, one on the scroll disc and one on the hand wheel. This condition of course prevents the hand wheel from slipping back and prevents the balls from rolling down the incline of the cam.

In releasing the jaws from a work piece, I have provided a plurality of spring-pressed pin members 70 mounted in the back face of the chuck body 10 for normally pressing the scroll disc back so that the spring-pressed pins 40 will again engage in the spherical depressions 42 and the scroll disc will rotate with the hand wheel 44.

As has previously been mentioned, it is sometimes desirable to employ auxiliary jaws in connection with the chuck holding and locking jaws for assisting in maintaining the balance of a work piece, especially when the piece is of sufficient length to extend beyond the chuck. For this purpose I have mounted a second scroll disc 74 and hand wheel 76 back of the radial thrust bearing 62. The scroll disc 70 and hand wheel 76 are mounted for free rotation on the shaft 28.

A similar scroll face 78 and similar retaining jaws 18 may be employed for the auxiliary jaw set, the jaws 18 being mounted in an auxiliary chuck 10a that is fastened to the shaft 28. The hand wheel 76 may normally be rotated by means of a spring-pressed connection with the hand wheel 44, the connection including the spring-pressed plunger 80 which has its forward end engaging a semi-spherical pocket 82 in a hardened steel plate 84 fastened to the back side of the hand wheel 44. A plurality of these spring-pressed plungers and pockets are desired, the number depending upon the size and general construction of the entire chuck mechanism.

With this construction, both the forward scroll disc 30 and the back scroll disc 74 may be actuated to move the jaws to work-holding position by rotating the hand wheel 44. However, in order to effectively lock the forward jaws upon the work piece under extremely high pressure by the use of the cam surfaces and balls 48 disposed between the hand wheel 44 and the scroll disc 30, the two hand wheels 44 and 76 will become disengaged, the hand wheel 76 thus being independently operable from the hand wheel 44 when desired.

From the above and foregoing description it can be seen that I have provided a compartively simple yet highly effective manually operable chuck, one in which the work-holding jaws can be rigidly fastened to and locked on the work piece to be held, the locking and holding being done with extremely high pressure, and yet when desired they can be easily and quickly released and the work piece removed.

While I have illustrated and described a specific embodiment of the invention, it will be apparent to those skilled in the art that changes and modifications may be made in any of the details shown, and I do not wish to be limited in any particular; rather what I desire to secure and protect by Letters Patent of the United States is:

1. The combination with a chuck body of the type having a plurality of radially movable work holding jaws, of a scroll disc having a spiral thread upon its forward face, teeth on each of said jaws engaging said thread and a hand wheel mounted for rotation adjacent said scroll disc, a ball retainer ring mounted between said scroll disc and said hand wheel, a plurality of balls mounted in said retainer, each of said balls in contact with the back surface of said scroll disc and an arcuate cam path on the adjacent face of said hand wheel.

2. The combination with a chuck body of the type having a plurality of radially movable work holding jaws, of a scroll disc having a spiral thread upon its forward face, teeth on each of said jaws engaging said thread and a hand wheel mounted for rotation adjacent said scroll disc, a ball retainer ring mounted between said scroll disc and said hand wheel, a plurality of balls mounted in said retainer, each of said balls in contact with the back surface of said scroll disc and an arcuate cam path on the adjacent face of said hand wheel, said cam path comprising a row of raised steps.

3. The combination with a chuck body of the type having a plurality of radially movable work holding jaws, of a scroll disc having a spiral thread upon its forward face, said thread being wedge-shaped, complementary teeth on each of said jaws engaging said thread and a hand wheel mounted for rotation adjacent said scroll disc, a ball retainer ring mounted between said scroll disc and said hand wheel, a plurality of balls mounted in said retainer, each of said balls in contact with the back surface of said scroll disc and an arcuate sloping cam path on the adjacent face of said hand wheel.

4. The combination with a chuck body of the type having a plurality of radially movable work holding jaws, of a scroll disc having a spiral thread upon its forward face, said thread being wedge-shaped, complementary teeth on each of said jaws engaging said thread and a hand wheel mounted for rotation adjacent said scroll disc, a ball retainer ring mounted between said scroll disc and said hand wheel, a plurality of balls mounted in said retainer, each of said balls in contact with the back surface of said scroll disc and an arcuate sloping cam path on the adjacent face of said hand wheel, said scroll disc laterally movable for locking action with the teeth of said jaws as said hand wheel is rotated to move said balls upon said cam paths.

5. A chuck comprising a body having a central opening and an inwardly projecting hub, said body having radial slots therein, radially movable work holding jaws mounted in said slots, a scroll disc rotatably mounted on said hub and having a spiral thread upon its forward face, teeth on each of said jaws engaging said thread and a hand wheel mounted for rotation on said hub adjacent said scroll disc, a ball retainer ring mounted between said scroll disc and said hand wheel, a plurality of balls mounted in said retainer, each of said balls in contact with the back surface of said scroll disc and an arcuate cam path on the adjacent face of said hand wheel whereby when said hand wheel is rotated said scroll disc is moved axially on said hub to lock said jaws in a work-holding position.

6. The combination with a chuck body of the type having a plurality of radially movable work holding jaws, of a scroll disc having a spiral thread upon its forward face, teeth on each of said jaws engaging said thread and manually operable means mounted for rotation adjacent said scroll disc, a ball retainer ring mounted between said scroll disc and said means, a plurality of balls mounted in said retainer, each of said balls in contact with the back surface of said scroll disc and with an arcuate cam path on the adjacent face of said means.

7. A chuck for holding a work piece, comprising a hollow shaft, a chuck body mounted at the front end of the same and a second chuck body mounted back therefrom, a plurality of work holding jaws radially disposed in each of said chuck bodies and capable of inward or outward movement therein, a scroll disc rotatably mounted on said hollow shaft adjacent said first mentioned chuck body, said scroll disc having a spiral thread upon its forward face, teeth on each of said jaws engaging said thread, a hand wheel mounted for rotation on said hollow shaft adjacent said scroll disc, a ball retainer ring mounted between said scroll disc and said hand wheel, a plurality of balls mounted in said retainer, each of said balls in contact with the back surface of the scroll disc and an arcuate cam path on the adjacent face of said hand wheel, a second hand wheel, a scroll disc connected thereto and having a spiral thread upon its back face, teeth on the work holding jaws in said second chuck engaging said thread, and means normally connecting both of said hand wheels for simultaneous rotation of the same to move both sets of work holding jaws in unison.

8. A chuck for holding a work piece, comprising a hollow shaft, a chuck body mounted at the front end of the same and a second chuck body mounted back therefrom, a plurality of work holding jaws radially disposed in each of said chuck bodies and capable of inward or outward movement therein, a scroll disc rotatably mounted on said hollow shaft adjacent said first mentioned chuck body, said scroll disc having a spiral thread upon its forward face, teeth on each of said jaws engaging said thread, a hand wheel mounted for rotation on said hollow shaft adjacent said scroll disc, a ball retainer ring mounted between said scroll disc and said hand wheel, a plurality of balls mounted in said retainer, each of said balls in contact with the back surface of the scroll disc and an arcuate cam path on the adjacent face of said hand wheel, a second hand wheel, a scroll disc connected thereto and having a spiral thread upon its back face, teeth on the work holding jaws in said second chuck engaging said thread, and means normally connecting both of said hand wheels for simultaneous rotation of the same to move both sets of work holding jaws in unison, said means including a plurality of spring-pressed plungers mounted in one of said hand wheels and complementary pockets for the ends of said plungers in the other hand wheel.

9. A chuck for holding a work piece, comprising a hollow shaft, a chuck body mounted at the front end of the same and a second chuck body mounted back therefrom, a plurality of work holding jaws radially disposed in each of said chuck bodies and capable of inward or outward movement therein, a scroll disc rotatably mounted on said hollow shaft adjacent said first mentioned chuck body, said scroll disc having a spiral thread upon its forward face, teeth on each of said jaws engaging said thread, a hand wheel mounted for rotation on said hollow shaft adjacent said scroll disc, yielding means for frictionally locking said hand wheel and scroll disc together for rotation in one direction, a second hand wheel, a scroll disc connected thereto and having a spiral thread upon its back face, teeth on the work holding jaws in said second chuck engaging said thread, and means yieldingly connecting both of said hand wheels for simultaneous rotation of the same to move both sets of work holding jaws in unison.

10. A chuck for holding a work piece, comprising a hollow shaft, a chuck body mounted at the front end of the same and a second chuck body mounted back therefrom, a plurality of work holding jaws radially disposed in each of said chuck bodies and capable of inward or outward movement therein, a scroll disc rotatably mounted on said hollow shaft adjacent said first mentioned chuck body, said scroll disc having a spiral thread upon its forward face, teeth on each of said jaws engaging said thread, a hand wheel mounted for rotation on said hollow shaft adjacent said scroll disc, yielding means for frictionally locking said hand wheel and scroll disc together for rotation in one direction, a second hand wheel, a scroll disc connected thereto and having a spiral thread upon its back face, teeth on the work holding jaws in said second chuck engaging said thread, and means yieldingly connecting both of said hand wheels for simultaneous rotation of the same to move both sets of work holding jaws in unison, said means including a plurality of spring-pressed plungers mounted in one of said hand wheels and complementary pockets for the ends of said plungers in the other hand wheel.

References Cited in the file of this patent
UNITED STATES PATENTS

| 1,784,908 | Regan | Dec. 16, 1930 |
| 2,695,177 | Cawi | Nov. 23, 1954 |